United States Patent [19]

Ueda et al.

[11] Patent Number: 4,805,999
[45] Date of Patent: Feb. 21, 1989

[54] VARIABLE MAGNIFICATION LENS SYSTEM WITH CONSTANT OBJECT-IMAGE DISTANCE

[75] Inventors: Toshihiko Ueda, Toyokawa; Kunihiko Konoma, Aichi, both of Japan

[73] Assignee: Minolta Camera Kabushiki Kaisha, Osaka, Japan

[21] Appl. No.: 933,091

[22] Filed: Nov. 20, 1986

[30] Foreign Application Priority Data

Nov. 22, 1985 [JP] Japan .................. 60-263189

[51] Int. Cl.⁴ .......................................... C02B 15/16
[52] U.S. Cl. ................................................ 350/425
[58] Field of Search ........................................ 350/425

[56] References Cited

U.S. PATENT DOCUMENTS 4,037,937  7/1977  Minoura ............................ 350/425
4,149,774  4/1979  Hirano et al. ..................... 350/425

Primary Examiner—Bruce Y. Arnold
Assistant Examiner—Rebecca D. Gass
Attorney, Agent, or Firm—Price, Gess & Ubell

[57] ABSTRACT

The present invention is a variable magnification lens system with a constant object-image distance. The lens system comprises an aperture stop, two fixed lens units constructed symmetrically with each other and two movable lens units constructed symmetrically with each other and located between the two fixed lens units, wherein the two lens units are positioned symmetrically with each other with respect to the aperture stop at the time of equal magnification, while the two lens units are positioned asymmetrically with each other with respect to the aperture stop during other magnification ratios.

2 Claims, 5 Drawing Sheets

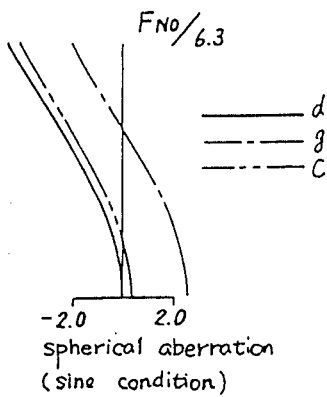
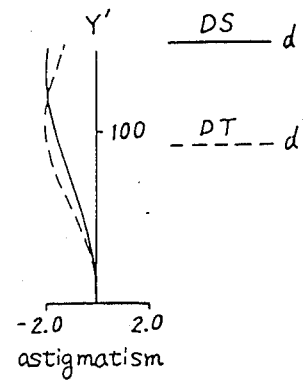
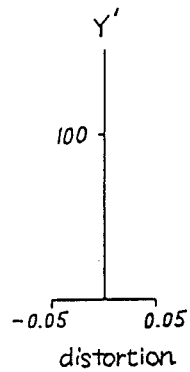
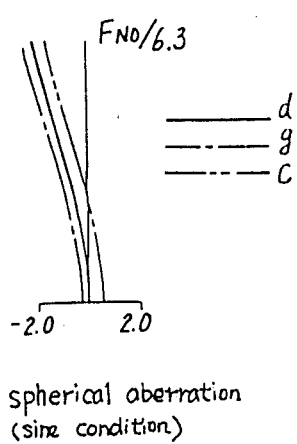
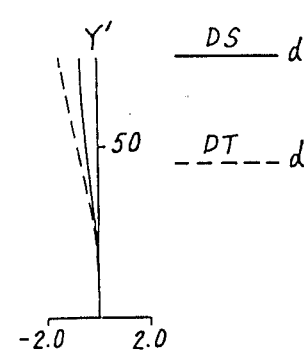
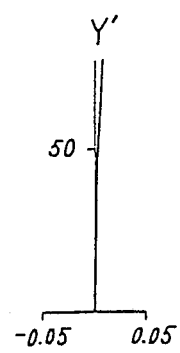
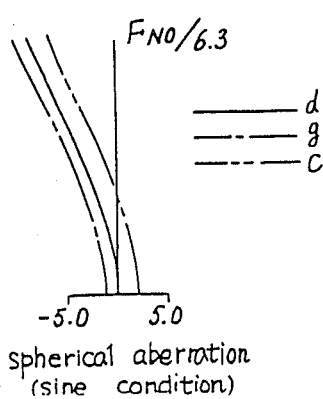
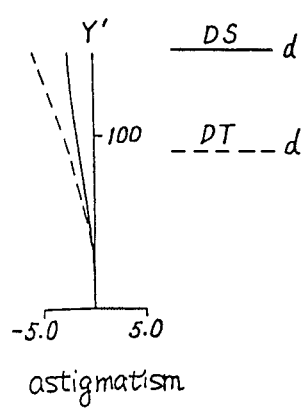
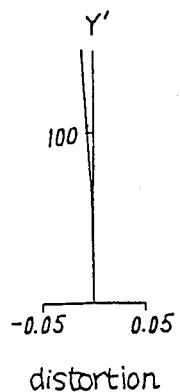

spherical aberration (sine condition)

astigmatism distortion spherical aberration (sine condition)

astigmatism distortion spherical aberration (sine condition)

astigmatism distortion spherical aberration (sine condition)

astigmatism distortion spherical aberration (sine condition)

astigmatism distortion spherical aberration (sine condition)

astigmatism distortion

FNO/8.0
— d
—·— g
—··— c
-2.0  2.0
spherical aberration
(sine condition)

Y'
— DS  d
--- DT  d
100
-2.0  2.0
astigmatism

Y'
100
-0.05  0.05
distortion

FNO/8.0
— d
—·— g
—··— c
-2.0  2.0
spherical aberration
(sine condition)

Y'
— DS  d
--- DT  d
50
-2.0  2.0
astigmatism

Y'
50
-0.05  0.05
distortion

FNO/8.0
— d
—·— g
—··— c
-5.0  5.0
spherical aberration
(sine condition)

Y'
— DS  d
--- DT  d
100
-5.0  5.0
astigmatism

Y'
100
-0.05  0.05
distortion

VARIABLE MAGNIFICATION LENS SYSTEM WITH CONSTANT OBJECT-IMAGE DISTANCE

BACKGROUND OF THE INVENTION

1. Field of the Invention

The present invention relates to a variable magnification lens system with a constant object-image distance for use in copying machines or the like, and more particularly, to a lens system capable of continuously varying the magnification which includes equal magnification while keeping the distance between the object and image planes constant.

2. Description of the Prior Art

Recently, an optical system capable of continuously varying the magnification of the image was introduced for in copying machines and machines for making up printing originals or the like. When a lens with a fixed focal length is used in such an optical system, it is necessary to alter the conjugate distance by shifting of the lens. The conjugate distance is altered by shifting a mirror provided in the optical path, for example. However, the optical system mentioned above has the drawback of necessitating a complicated shift mechanism for the mirror.

For eliminating the above drawback, it was proposed to use a variable magnification lens system with a constant object-image distance, for example, in Japanese Laid Open Patent Application No. 57-67909. This patent application discloses a lens system having a first lens unit with negative refractive power, a second lens unit with positive refracting power, a third lens unit with positive refracting power and a fourth lens unit with negative refractive power, wherein the second and third lens units are movable along the optical axis symmetrically with the central plane of the lens system while fixing the first and fourth lens units. The system provides a magnification range from $-1.58$ to $-0.63$.

The lens system disclosed in Japanese Patent Application No. 57-67909, however, can not have a wider range of magnifications than the above-mentioned range because the coma aberration increases in the off-axial region if the range is widened, and it further necessitates a long object-image distance for obtaining the same optical performance as that of a lens of a fixed focal length. In addition, aberrations of this lens system increases as the magnification varies from the equal magnification.

SUMMARY OF THE INVENTION

Accordingly, an object of the present invention is to provide a lens system having a wide range of magnifications.

Another object of the present invention is to provide a lens system having a satisfactory aberration characteristic over the entire range of magnification.

The present invention provides a variable magnification lens system which comprises an aperture stop positioned at the center of the lens system, a fixed first lens unit having negative refracting power and including at least one negative lens, a movable second lens unit positioned between the first lens unit and the aperture stop and consisting of a positive lens, a negative lens and a positive lens, a movable third lens unit constructed symmetrically with the second lens unit with respect to the aperture stop and a fixed fourth lens unit positioned and constructed symmetrically with the first lens unit with respect to the aperture. The movable second and third lens units are positioned symmetrically with each other with respect to the aperture stop at unity magnification, while the second and third lens units are positioned asymmetrically with each other with respect to the aperture stop at the time of any other magnification. This lens system is used in a variable magnification optical system wherein the lens system is shifted along the axis in accordance with a selected magnification and the second and third lens units are shifted in cooperation with the shifting of the lens system. The object-image distance is kept constant for any magnification, consequently eliminating the need to shift other mirrors.

The features of the present invention which are believed to be novel are set forth with particularity in the attended claims. The features, further objects and advantages of the present invention will best be understood by reference to the following description, taken in conjunction with the accompanying drawings.

BRIEF DESCRIPTION OF THE DRAWINGS

FIGS. 3a to 3c show the aberration curves of the first embodiment at the equal magnification;

FIGS. 4a to 4c show the aberration curves of the first embodiment at a magnification of $-0.500\times$;

FIGS. 5a to 5c show the aberration curves of the first embodiment at a magnification of $-2.000\times$;

FIGS. 15a to 15c show the aberration curves of the fifth embodiment at an equal magnification;

FIGS. 16a to 16c show the aberration curves of the fifth embodiment at a magnification of $-0.640\times$; and FIGS. 17a to 17c show the aberration curves of the fifth embodiment at a magnification of $-1.414\times$.

DETAILED DESCRIPTION OF THE PREFERRED EMBODIMENTS

Figure 1:
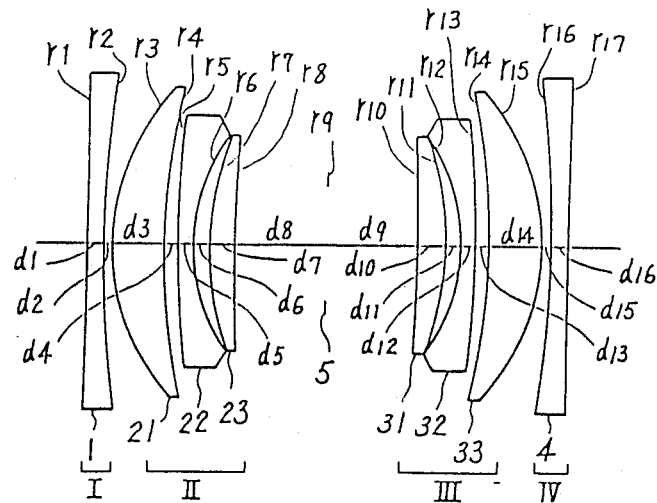
FIG. 1 represents a schematic cross sectional view of the lens system according to a first to a fifth embodiments of the present invention.

The following description is provided to enable any person skilled in the optical field to make and use the invention and sets forth the best modes contemplated by the inventors for carrying out the invention. Various modifications, however, will be readily apparent to those skilled in the art, since the generic principles of the present invention have been defined herein specifically to provide an improved variable magnification lens systems. The derivation of the relation of the powers and the like set forth herein can be accomplished with the assistance of a computer. The present invention represents the parameters of a compromise balance of acceptable aberrations which can be relatively easily realized to provide the lens system of the present invention.

In the drawing, the schematic cross sectional view discloses the position of the lens components or lens elements with reference numbers respectively. Because of the number of lens elements involved, the drawing (FIG. 1) includes individual designations of the radii of curvature and axial distances for each lens element and air space. These values are provided in the accompanying tables, and the schematic cross sectional view of the embodiments follows the common practice; the object is positioned at the left-hand side of the drawing, and the image plane at the right-hand side thereof.

FIG. 1 shows the construction of the lens system of the present invention, which is substantially common through a first to a fifth embodiments. From the left hand side (the light incident side) of FIG. 1, there is provided in order a fixed first lens unit I having negative refracting power and including at least one negative lens element 1, a movable second lens unit II consisting of a positive lens element 21, a negative lens element 22 and a positive lens element 23, an aperture stop 5 located at the center of the lens system, a movable third lens unit III consisting of positive, negative and positive lens elements 31, 32 and 33 which are constructed symmetrically with the lens elements of the second lens unit II with respect to the aperture stop 5 and a fixed fourth lens unit IV including at least one negative lens element 4 constructed symmetrically with at least one negative lens element 1 with respect to the aperture stop 5. The second and third lens units II and III are shifted for varying the magnification so that at the equal magnification the second and third lens units II and III are positioned symmetrically with each other with respect to the aperture stop 5, while the lens units II and III are positioned symmetrically with each other with respect to the aperture stop 5 in other magnification ratios. The lens system of the present invention is used in a variable magnification optical system wherein the lens system is shifted along the axis in accordance with a selected magnification and the second and third lens units are shifted in cooperation with the shifting of the lens system. In such an optical system, the object-image distance is kept constant for any magnification, consequently eliminating the need to shift other mirrors.

Figure 2A:
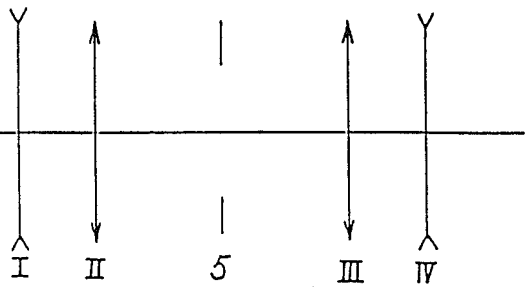
FIG. 2a is a schematic view showing the position of each lens unit at the equal magnification.
Figure 2B:
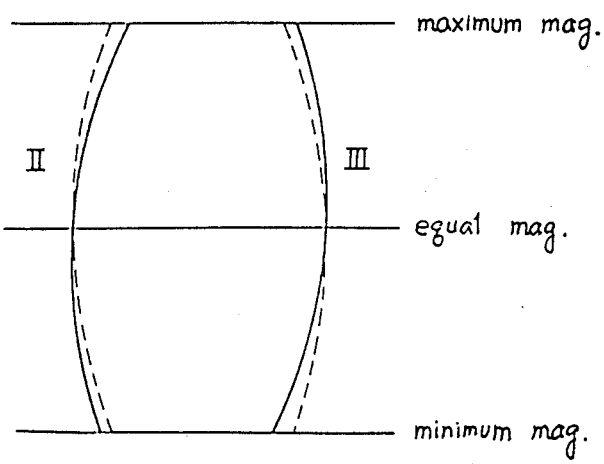
FIG. 2b is a schematic view showing shifting curves along which the second and third lens units are shifted to give selected magnifications.
Figure 6A:
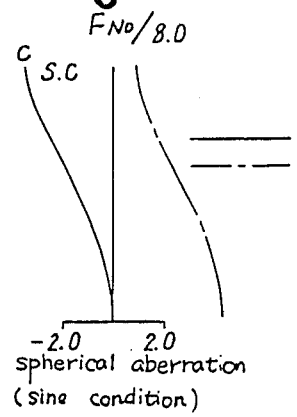
FIGS. 6a to 6c show the aberration curves of the second embodiment at an equal magnification.
Figure 6B:
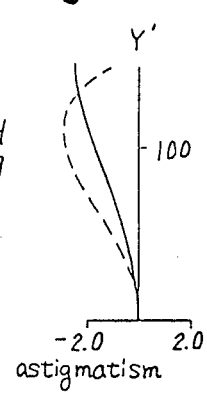
Figure 6C:
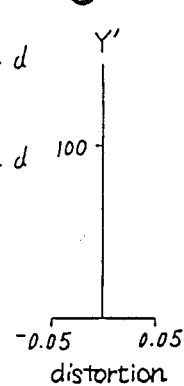
Figure 7A:
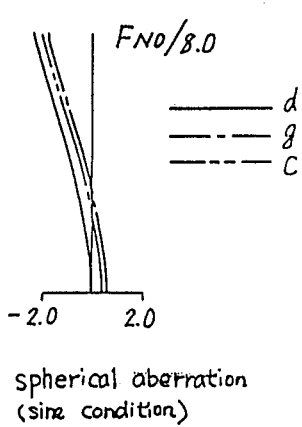
FIGS. 7a to 7c show the aberration curves of the second embodiment at a magnification of $-5.00\times$.
Figure 7B:
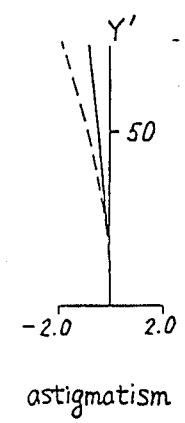
Figure 7C:
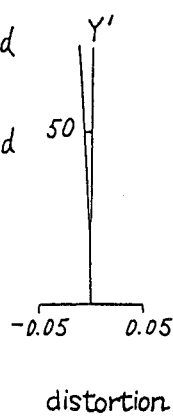
Figure 8A:
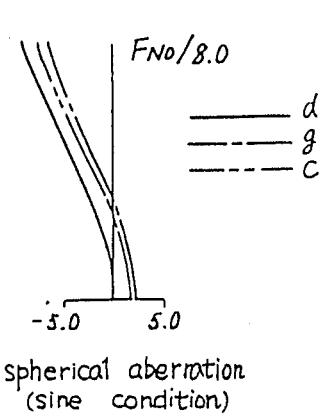
FIGS. 8a to 8c show the aberration curves of the second embodiment at a magnification of $-2.00\times$.
Figure 8B:
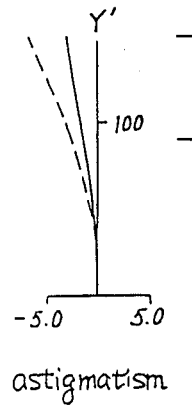
Figure 8C:
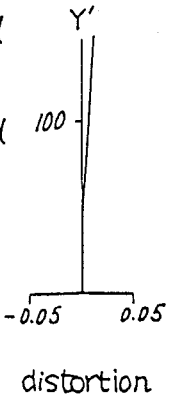
Figure 9A:
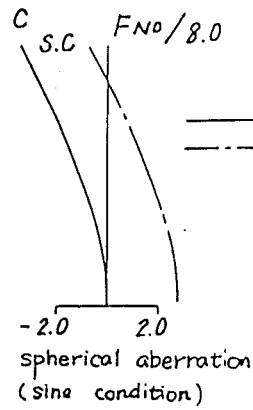
FIGS. 9a to 9c show the aberration curves of the third embodiment at an equal magnification.
Figure 9B:
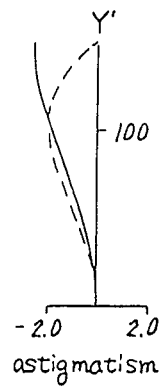
Figure 9C:
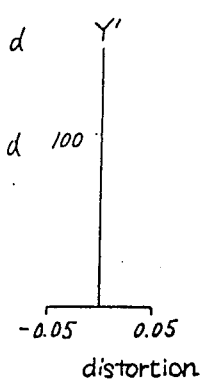
Figure 10A:
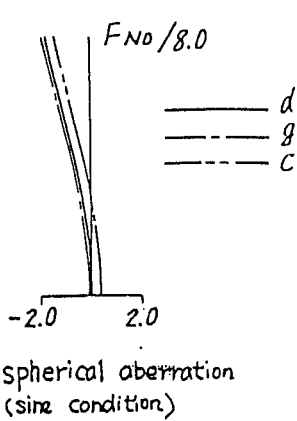
FIGS. 10a to 10c show the aberration curves of the third embodiment at a magnification of $-5.00\times$.
Figure 10B:
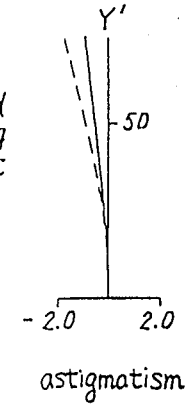
Figure 10C:
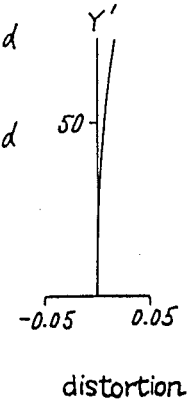
Figure 11A:
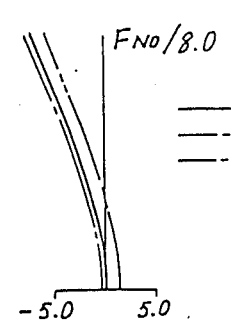
FIGS. 11a to 11c show the aberration curves of the third embodiment at a magnification of $-2.00\times$.
Figure 11B:
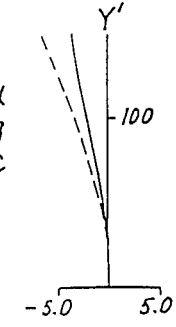
Figure 11C:
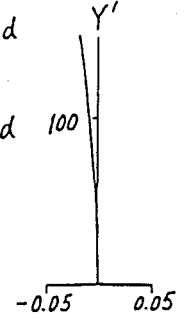
Figure 12A:
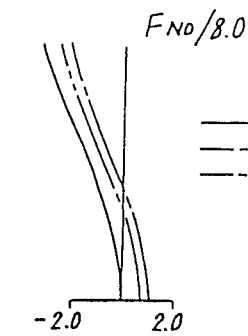
FIGS. 12a to 12c show the aberration curves of the fourth embodiment at an equal magnification.
Figure 12B:
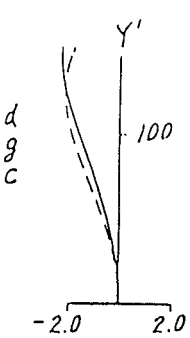
Figure 12C:
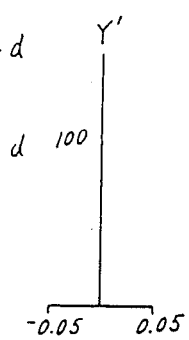
Figure 13A:
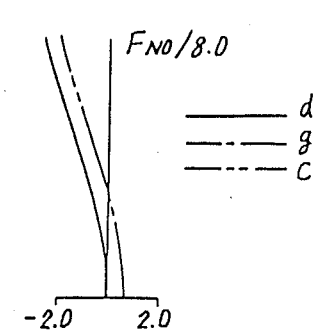
FIGS. 13a to 13c show the aberration curves of the fourth embodiment at a magnification of $-0.640\times$.
Figure 13B:
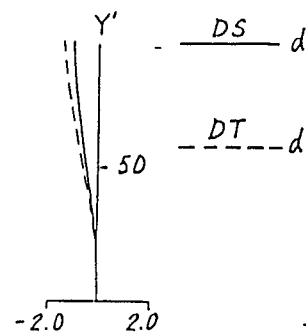
Figure 13C:
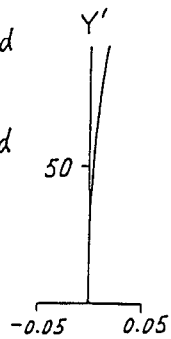
Figure 14A:
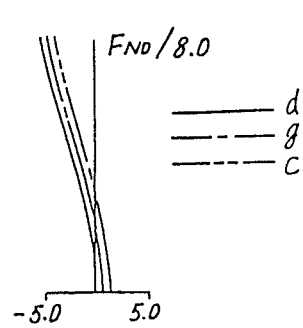
FIGS. 14a to 14c show the aberration curves of the fourth embodiment at a magnification of $-1.414\times$.
Figure 14B:
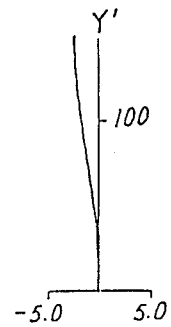
Figure 14C:
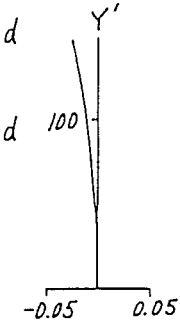

Referring to FIG. 2, there will be explained a shifting of the second and third lens units. FIG. 2b shows the shifting curves (solid line) of the second and third lens units II and III. For reference, dotted lines are shown which indicate the shifting curves in the case where the second and third lens units are shifted symmetrically with each other with respect to the aperture stop 5. As will be understood from FIG. 2b, the second and third lens units II and III are shifted so as to be biased toward the first lens unit I when the selected magnification is larger than the equal magnification (enlarged side) and toward the fourth lens unit IV when the selected magnification is smaller than the equal magnification (reduced side).

With a variale magnification lens system having a constant object-image distance and a symmetrical construction and including movable lens groups shiftable symmetrically with respect to the aperture stop, aberrations of the lens system will increase as the magnification increasingly varies from the equal magnification although aberrations will be small at a magnification equal or close to the equal magnification. Meanwhile, a variable magnification lens system with an asymmetrical lens construction may be inadequate when giving the equal magnification like the system of the present invention. In view of the above, the lens system of the present invention has a symmetrical lens construction but the movable lens groups thereof are shifted asymmetrically. This leads to high performance and a wide range of available magnifications.

The following tables 1 to 5 disclose, respectively, the first to fifth embodiments of the present invention. In the tables, r is the radius of curvature with respective subscript numbers indicating the surfaces from the light incident side to the light exit side, d represents the axial distance and includes both the air spaces and the actual thickness of the lenses along the optical axis, N equals the refractive index and subscript numbers refer to the specific lens elements from the light incident side to the light exit side, and $\nu$ equals the Abbe number and again the subscript numbers refer to the specific lens elements. Variable axial distances $d_2$, $d_8$, $d_9$ and $d_{15}$ are also shown for several magnifications. The first, second and third embodiments, as will be understood, have a wide range of magnifications, i.e., $-0.500\times$ to $-2.00\times$ and high performance in aberrations. The fourth and fifth embodiments have a usual magnification range, but exhibit high performance over the entire range of magnifications.

TABLE 1

(first embodiment)

magnification $-0.50 \sim -2.00$ (focal length $187.5 \sim 215.1$)
F No. 6.3

| | | radius of curvature | | axial distance | refractive index (Nd) | Abbe number ($\nu d$) |
|---|---|---|---|---|---|---|
| I | $r_1$ | −214.792 | $d_1$ | 3.516 | $N_1$ 1.57501 | $\nu_1$ 41.51 |
| | $r_2$ | 4704.773 | $d_2$ | 0.500 | | |
| II | $r_3$ | 57.788 | $d_3$ | 13.431 | $N_2$ 1.74400 | $\nu_2$ 44.93 |
| | $r_4$ | −430.213 | $d_4$ | 4.033 | | |
| | $r_5$ | −230.859 | $d_5$ | 2.979 | $N_3$ 1.62004 | $\nu_3$ 36.30 |
| | $r_6$ | 44.928 | $d_6$ | 2.448 | | |
| | $r_7$ | 94.978 | $d_7$ | 5.168 | $N_4$ 1.66892 | $\nu_4$ 45.01 |
| | $r_8$ | 802.529 | $d_8$ | 19.500 | | |
| | $r_9$ | ∞ | $d_9$ | 19.500 | | |
| III | $r_{10}$ | −802.529 | $d_{10}$ | −5.168 | $N_5$ 1.66892 | $\nu_5$ 45.01 |
| | $r_{11}$ | −94.978 | $d_{11}$ | 2.448 | | |
| | $r_{12}$ | −44.928 | $d_{12}$ | 2.979 | $N_6$ 1.62004 | $\nu_6$ 36.30 |
| | $r_{13}$ | 230.859 | $d_{13}$ | 4.033 | | |
| | $r_{14}$ | 430.213 | $d_{14}$ | 13.431 | $N_7$ 1.74400 | $\nu 7$ 44.93 |
| | $r_{15}$ | −57.788 | $d_{15}$ | 0.500 | | |
| | $r_{16}$ | −4704.773 | | | | |

TABLE 1-continued (first embodiment)

| | | | | | | |
|---|---|---|---|---|---|---|
| IV | | | $d_{16}$ | 3.516 | $N_8$ 1.57501 | $\nu_8$ 41.51 |
| | $r_{17}$ | 214.792 | | | | |

$\Sigma d = 103.151$

| varied distance | mag. | | | | |
|---|---|---|---|---|---|
| | 0.50 | 0.707 | 1.00 | 1.414 | 2.00 |
| $d_2$ | 10.945 | 2.794 | 0.500 | 4.289 | 13.805 |
| $d_8$ | 9.055 | 17.206 | 19.500 | 15.711 | 6.195 |
| $d_9$ | 6.195 | 15.711 | 19.500 | 17.206 | 9.055 |
| $d_{15}$ | 13.805 | 4.284 | 0.500 | 2.794 | 10.945 |

TABLE 2

(second embodiment)

magnification $-0.50 \sim -2.00$ (focal length $188.1 \sim 215.0$)
F No. 8.0

| | | radius of curvature | axial distance | refractive index (Nd) | Abbe number ($\nu$d) |
|---|---|---|---|---|---|
| I | $r_1$ | $-1632.519$ | $d_1$ 3.463 | $N_1$ 1.58144 | $\nu_1$ 40.89 |
| | $r_2$ | 238.107 | $d_2$ 2.000 | | |
| II | $r_3$ | 44.400 | $d_3$ 10.000 | $N_2$ 1.74400 | $\nu_2$ 44.93 |
| | $r_4$ | 141.792 | $d_4$ 2.500 | | |
| | $r_5$ | 223.222 | $d_5$ 3.030 | $N_3$ 1.62588 | $\nu_3$ 35.74 |
| | $r_6$ | 35.949 | $d_6$ 3.169 | | |
| | $r_7$ | 69.437 | $d_7$ 4.762 | $N_4$ 1.67003 | $\nu_4$ 47.15 |
| | $r_8$ | 267.275 | $d_8$ 18.000 | | |
| | $r_9$ | $\infty$ | $d_9$ 18.000 | | |
| III | $r_{10}$ | $-267.275$ | $d_{10}$ 4.762 | $N_5$ 1.67003 | $\nu_5$ 47.15 |
| | $r_{11}$ | $-69.437$ | $d_{11}$ 3.169 | | |
| | $r_{12}$ | $-35.949$ | $d_{12}$ 3.030 | $N_6$ 1.62588 | $\nu_6$ 35.74 |
| | $r_{13}$ | $-223.222$ | $d_{13}$ 2.500 | | |
| | $r_{14}$ | $-141.792$ | $d_{14}$ 10.000 | $N_7$ 1.74400 | $\nu_7$ 44.93 |
| | $r_{15}$ | $-44.400$ | $d_{15}$ 2.000 | | |
| IV | $r_{16}$ | $-238.107$ | $d_{16}$ 3.463 | $N_8$ 1.58144 | $\nu_8$ 40.89 |
| | $r_{17}$ | 1632.519 | | | |

$\Sigma d = 93.848$

| varied distance | mag. | | | | |
|---|---|---|---|---|---|
| | $-0.50$ | $-0.707$ | $-1.00$ | $-1.414$ | $-2.00$ |
| $d_2$ | 12.232 | 4.234 | 2.000 | 5.730 | 15.103 |
| $d_8$ | 7.768 | 15.766 | 18.000 | 14.270 | 4.897 |
| $d_9$ | 4.897 | 14.270 | 18.000 | 15.766 | 7.768 |
| $d_{15}$ | 15.103 | 5.730 | 2.000 | 4.234 | 12.232 |

TABLE 3

(third embodiment)

magnification $-2.0 \sim -0.5$ (focal length $187.4 \sim 215.1$)
F No. 8.0

| | | radius of curvature | axial distance | refractive index (Nd) | Abbe number ($\nu$d) |
|---|---|---|---|---|---|
| I | $r_1$ | $-285.098$ | $d_1$ 3.500 | $N_1$ 1.56732 | $\nu_1$ 42.82 |
| | $r_2$ | 703.432 | $d_2$ 0.500 | | |
| | $r_3$ | 57.407 | $d_3$ 13.959 | $N_2$ 1.77249 | $\nu_2$ 49.60 |
| | $r_4$ | $-1670.787$ | $d_4$ 4.571 | | |
| II | $r_5$ | $-395.437$ | $d_5$ 2.465 | $N_3$ 1.65332 | $\nu_3$ 39.72 |
| | $r_6$ | 44.192 | $d_6$ 2.537 | | |
| | $r_7$ | 83.592 | $d_7$ 4.047 | $N_4$ 1.66672 | $\nu_4$ 48.30 |
| | $r_8$ | 548.047 | $d_8$ 19.500 | | |
| | $r_9$ | $\infty$ | $d_9$ 19.500 | | |
| III | $r_{10}$ | $-548.047$ | $d_{10}$ 4.047 | $N_5$ 1.66672 | $\nu_5$ 48.30 |
| | $r_{11}$ | $-83.592$ | $d_{11}$ 2.537 | | |
| | $r_{12}$ | $-44.192$ | $d_{12}$ 2.465 | $N_6$ 1.65332 | $\nu_6$ 39.72 |
| | $r_{13}$ | 395.437 | $d_{13}$ 4.571 | | |
| | $r_{14}$ | 1670.787 | $d_{14}$ 13.959 | $N_7$ 1.77249 | $\nu_7$ 49.60 |
| | $r_{15}$ | $-57.407$ | $d_{15}$ 0.500 | | |
| IV | $r_{16}$ | $-703.432$ | $d_{16}$ 3.500 | $N_8$ 1.56732 | $\nu_8$ 42.82 |
| | $r_{17}$ | 285.098 | | | |

$\Sigma d = 102.155$

| varied distance | mag. | | | | |
|---|---|---|---|---|---|
| | $-0.50$ | $-0.64$ | $-1.00$ | $-1.563$ | $-2.00$ |
| $d_2$ | 10.934 | 4.557 | 0.500 | 6.461 | 13.792 |
| $d_8$ | 9.066 | 15.443 | 19.500 | 13.539 | 6.208 |
| $d_9$ | 6.208 | 13.539 | 19.500 | 15.443 | 9.066 |
| $d_{15}$ | 13.792 | 6.461 | 0.500 | 4.557 | 10.934 |

TABLE 4

(fourth embodiment)

magnification $-0.64 \sim -1.414$ (focal length $203.1 \sim 215.2$)
F No. 8.0

| | | radius of curvature | axial distance | refractive index (Nd) | Abbe number ($\nu$d) |
|---|---|---|---|---|---|
| I | $r_1$ | 368.937 | $d_1$ 3.500 | $N_1$ 1.57501 | $\nu_1$ 41.51 |
| | $r_2$ | 165.681 | $d_2$ 2.500 | | |
| II | $r_3$ | 48.629 | $d_3$ 10.000 | $N_2$ 1.74400 | $\nu_2$ 44.93 |
| | $r_4$ | 179.999 | $d_4$ 2.500 | | |
| | $r_5$ | 187.562 | $d_5$ 3.000 | $N_3$ 1.62588 | $\nu_3$ 35.74 |
| | $r_6$ | 37.475 | $d_6$ 2.500 | | |
| | $r_7$ | 62.204 | $d_7$ 4.800 | $N_4$ 1.67003 | $\nu_4$ 47.15 |
| | $r_8$ | 123.945 | $d_8$ 11.500 | | |
| | $r_9$ | $\infty$ | $d_9$ 11.500 | | |
| III | $r_{10}$ | $-123.945$ | $d_{10}$ 4.800 | $N_5$ 1.67003 | $\nu_5$ 47.15 |
| | $r_{11}$ | $-62.204$ | $d_{11}$ 2.500 | | |
| | $r_{12}$ | $-37.475$ | $d_{12}$ 3.000 | $N_6$ 1.62588 | $\nu_6$ 35.74 |
| | $r_{13}$ | $-187.562$ | $d_{13}$ 2.500 | | |
| | $r_{14}$ | $-179.999$ | $d_{14}$ 10.000 | $N_7$ 1.74400 | $\nu_7$ 44.93 |
| | $r_{15}$ | $-48.629$ | $d_{15}$ 2.500 | | |
| IV | $r_{16}$ | $-165.681$ | $d_{16}$ 3.500 | $N_8$ 1.57501 | $\nu_8$ 41.51 |
| | $r_{17}$ | $-368.937$ | | | |

$\Sigma d = 80.600$ varied mag.

TABLE 4-continued (fourth embodiment)

| distance | −0.64 | −0.707 | −1.00 | −1.414 |
|---|---|---|---|---|
| $d_2$ | 8.413 | 5.920 | 2.500 | 7.413 |
| $d_8$ | 5.587 | 8.080 | 11.500 | 6.587 |
| $d_9$ | 3.683 | 6.587 | 11.500 | 8.080 |
| $d_{15}$ | 10.317 | 7.413 | 2.500 | 5.920 |

TABLE 5

(fifth embodiment)

magnification −0.64 ~ −1.414
F No. 6.3

| | radius of curvature | | axial distance | refractive index (Nd) | Abbe number ($\nu$d) |
|---|---|---|---|---|---|
| I | $r_1$ | 297.217 | | | |
| | | | $d_1$ 3.500 | $N_1$ 1.57501 | $\nu_1$ 41.51 |
| | $r_2$ | 141.905 | | | |
| | | | $d_2$ 0.500 | | |
| | $r_3$ | 46.092 | | | |
| | | | $d_3$ 9.000 | $N_2$ 1.74400 | $\nu_2$ 44.93 |
| | $r_4$ | 152.526 | | | |
| | | | $d_4$ 2.500 | | |
| | $r_5$ | 159.199 | | | |
| II | | | $d_5$ 3.000 | $N_3$ 1.62588 | $\nu_3$ 35.74 |
| | $r_6$ | 35.811 | | | |
| | | | $d_6$ 2.800 | | |
| | $r_7$ | 59.139 | | | |
| | | | $d_7$ 4.800 | $N_4$ 1.67003 | $\nu_4$ 47.15 |
| | $r_8$ | 117.709 | | | |
| | | | $d_8$ 11.500 | | |
| | $r_9$ | $\infty$ | | | |
| | | | $d_9$ 11.500 | | |
| | $r_{10}$ | −117.709 | | | |
| | | | $d_{10}$ 4.800 | $N_5$ 1.67003 | $\nu_5$ 47.15 |
| | $r_{11}$ | −59.139 | | | |
| | | | $d_{11}$ 2.800 | | |
| | $r_{12}$ | −35.811 | | | |
| III | | | $d_{12}$ 3.000 | $N_6$ 1.62588 | $\nu_6$ 35.74 |
| | $r_{13}$ | −159.199 | | | |
| | | | $d_{13}$ 2.500 | | |
| | $r_{14}$ | −152.526 | | | |
| | | | $d_{14}$ 9.000 | $N_7$ 1.74400 | $\nu_7$ 44.93 |
| | $r_{15}$ | −46.092 | | | |
| | | | $d_{15}$ 0.500 | | |
| | $r_{16}$ | −141.905 | | | |
| IV | | | $d_{16}$ 3.500 | $N_8$ 1.57501 | $\nu_8$ 41.51 |
| | $r_{17}$ | −297.217 | | | |

TABLE 5-continued (fifth embodiment)

$\Sigma d = 75.200$

| varied distance | mag. | | | |
|---|---|---|---|---|
| | −0.64 | −0.707 | −1.00 | −1.414 |
| $d_2$ | 5.808 | 3.550 | 0.500 | 5.045 |
| $d_8$ | 6.192 | 8.450 | 11.500 | 6.955 |
| $d_9$ | 4.284 | 6.955 | 11.500 | 8.450 |
| $d_{15}$ | 7.716 | 5.045 | 0.500 | 3.550 |

What is claimed is:

1. A variable magnification lens system having the capacity of unity magnification, comprising from the light incident side:

a fixed first lens unit having negative refracting power in its entirety;

a movable second lens unit consisting of a positive lens element having a convex surface with a large curvature and faced to the light incident side of the whole lens system, a negative lens element having a concave surface with a large curvature and faced to the center of the whole lens system and a positive meniscus lens element having a convex surface faced to the light incident side of the whole lens system;

an aperture stop positioned at the center of the lens system;

a movable third lens unit constructed symmetrically with the second lens unit with respect to the aperture stop; and a fixed fourth lens unit positioned and constructed symmetrically with the first lens unit with respect to the aperture stop; wherein the second and third lens units are positioned symmetrically with each other with respect to the aperture stop at unity magnification, while the second and third lens units are positioned asymmetrically with each other with respect to the aperture stop at other than unity magnification.

2. A movable magnification lens system as claimed in claim 1, wherein the second and third lens units are shifted so as to be biased toward the first lens unit when a selected magnification is larger than unity magnification and toward the fourth lens unit when a selected magnification is smaller than unity magnification.

* * * * *